United States Patent
Mafera et al.

(10) Patent No.: US 10,320,884 B2
(45) Date of Patent: Jun. 11, 2019

(54) METHODS FOR PROCESSING SOLICITED MULTIMEDIA FILES

(71) Applicant: MOTOROLA SOLUTIONS, INC., Schaumburg, IL (US)

(72) Inventors: Paul F. Mafera, Winchester, MA (US); Brian R. Benson, Hoffman Estates, IL (US); Kenneth W. Douros, South Barrington, IL (US); Richard Charles Meyer, Boulder, CO (US); Vidya Sagar Pitta Eswara Chandra, Arlington Heights, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 539 days.

(21) Appl. No.: 14/727,293

(22) Filed: Jun. 1, 2015

(65) Prior Publication Data
US 2016/0352808 A1 Dec. 1, 2016

(51) Int. Cl.
*H04L 29/08* (2006.01)
*H04W 4/12* (2009.01)
*H04W 4/90* (2018.01)
*G06Q 10/10* (2012.01)

(52) U.S. Cl.
CPC ............ *H04L 67/06* (2013.01); *G06Q 10/10* (2013.01); *H04W 4/12* (2013.01); *H04W 4/90* (2018.02)

(58) Field of Classification Search
CPC ......... H04L 67/06; G06Q 10/10; H04W 4/12; H04W 4/22
See application file for complete search history.

(56) References Cited

U.S. PATENT DOCUMENTS

| | | | | |
|---|---|---|---|---|
| 7,809,587 B2 * | 10/2010 | Dorai | ................ | G06Q 40/08 703/6 |
| 8,401,154 B2 * | 3/2013 | Boni | ................ | H04M 11/04 379/45 |
| 8,638,907 B1 * | 1/2014 | Schumacher | ........... | H04W 4/90 379/45 |
| 8,688,069 B1 * | 4/2014 | Cazanas | ................ | H04W 4/90 455/404.2 |
| 8,868,028 B1 * | 10/2014 | Kaltsukis | ............. | H04W 4/028 455/404.1 |
| 8,874,068 B2 | 10/2014 | Mitchell, Jr. et al. | | |
| 9,066,201 B1 * | 6/2015 | Chen | ................ | H04W 4/90 |
| 9,137,383 B2 * | 9/2015 | Estrada | ............... | H04M 3/5116 |

(Continued)

OTHER PUBLICATIONS

PCT/US2016/032612 International Search Report and Written Opinion of the International Searching Authority dated Aug. 5, 2016 (12 pages).

*Primary Examiner* — Blake J Rubin
(74) *Attorney, Agent, or Firm* — Raguraman Kumaresan (57) ABSTRACT

Methods and systems for processing multimedia files associated with an incident. One method includes receiving a request to submit a multimedia file associated with the incident and, in response to receiving the request, transmitting a text message including an identifier of the incident to a communication device. The method also includes receiving, at the answering point, a reply to the text message, the reply including the multimedia file and the identifier, and storing, at the answering point, the multimedia file including using the identifier to link the multimedia file to an incident record for the incident.

19 Claims, 6 Drawing Sheets

(56) References Cited

U.S. PATENT DOCUMENTS

| | | | |
|---|---|---|---|
| 9,629,185 B1* | 4/2017 | Gluckman | H04W 4/90 |
| 2002/0006797 A1* | 1/2002 | Virtanen | H04W 4/14 |
| | | | 455/445 |
| 2003/0194350 A1* | 10/2003 | Stamatelos | G01N 35/00871 |
| | | | 422/83 |
| 2004/0189517 A1* | 9/2004 | Pande | G01S 5/0018 |
| | | | 342/357.4 |
| 2007/0040895 A1* | 2/2007 | Barbeau | G08B 13/19658 |
| | | | 348/14.01 |
| 2007/0060144 A1* | 3/2007 | Mills | H04W 92/02 |
| | | | 455/445 |
| 2007/0199076 A1* | 8/2007 | Rensin | H04L 29/06027 |
| | | | 726/27 |
| 2008/0064363 A1 | 3/2008 | Salafia et al. | |
| 2009/0047923 A1* | 2/2009 | Jain | G06F 19/323 |
| | | | 455/404.1 |
| 2009/0191850 A1* | 7/2009 | Cardwell, III | G08B 25/016 |
| | | | 455/412.2 |
| 2009/0210516 A1* | 8/2009 | Roskowski | G06Q 10/06 |
| | | | 709/219 |
| 2009/0227225 A1* | 9/2009 | Mitchell, Jr. | H04W 4/14 |
| | | | 455/404.2 |
| 2009/0284348 A1* | 11/2009 | Pfeffer | G08B 25/006 |
| | | | 340/7.3 |
| 2010/0003953 A1* | 1/2010 | Ray | G10L 13/043 |
| | | | 455/404.1 |
| 2010/0042647 A1* | 2/2010 | Schultz | H04L 12/1831 |
| | | | 379/85 |
| 2010/0048159 A1* | 2/2010 | Stenquist | G08B 25/016 |
| | | | 455/404.1 |
| 2010/0093306 A1* | 4/2010 | Hwang | H04L 12/1895 |
| | | | 455/404.2 |
| 2010/0227589 A1* | 9/2010 | Cook | H04M 1/72572 |
| | | | 455/411 |
| 2010/0261448 A1* | 10/2010 | Peters | H04W 4/22 |
| | | | 455/404.1 |
| 2010/0262668 A1* | 10/2010 | Piett | H04W 4/90 |
| | | | 709/206 |
| 2010/0296642 A1* | 11/2010 | Hidajat | H04M 1/2473 |
| | | | 379/142.06 |
| 2010/0297981 A1* | 11/2010 | Ballantyne | H04M 1/72536 |
| | | | 455/404.2 |
| 2010/0311385 A1* | 12/2010 | Hurwitz | H04W 4/029 |
| | | | 455/404.1 |
| 2010/0317317 A1* | 12/2010 | Maier | H04W 64/00 |
| | | | 455/404.2 |
| 2011/0018998 A1* | 1/2011 | Guzik | H04N 21/21 |
| | | | 348/143 |
| 2011/0134897 A1* | 6/2011 | Montemurro | H04M 1/72536 |
| | | | 370/338 |
| 2011/0151825 A1* | 6/2011 | Mathis | G08B 27/001 |
| | | | 455/404.1 |
| 2011/0237217 A1* | 9/2011 | Monks | H04W 4/90 |
| | | | 455/404.1 |
| 2011/0281546 A1* | 11/2011 | Libkind | H04L 12/1895 |
| | | | 455/404.1 |
| 2012/0003955 A1* | 1/2012 | Gabriel | H04W 4/22 |
| | | | 455/404.2 |
| 2012/0027189 A1* | 2/2012 | Shaffer | H04M 3/42068 |
| | | | 379/142.1 |
| 2012/0149324 A1* | 6/2012 | Daly | H04W 4/90 |
| | | | 455/404.1 |
| 2012/0309340 A1* | 12/2012 | Ray | H04W 4/90 |
| | | | 455/404.2 |
| 2012/0329420 A1* | 12/2012 | Zotti | H04M 1/72541 |
| | | | 455/404.2 |
| 2013/0141460 A1* | 6/2013 | Kane-Esrig | H04M 3/5116 |
| | | | 345/633 |
| 2013/0165068 A1* | 6/2013 | Keller | H04M 3/42382 |
| | | | 455/404.1 |
| 2013/0203371 A1* | 8/2013 | Snapp | H04W 4/12 |
| | | | 455/404.1 |
| 2013/0252649 A1* | 9/2013 | Siomina | H04W 4/02 |
| | | | 455/466 |
| 2014/0136609 A1* | 5/2014 | Churchill | H04L 51/046 |
| | | | 709/203 |
| 2014/0155017 A1* | 6/2014 | Fan | H04W 4/02 |
| | | | 455/404.1 |
| 2014/0213212 A1* | 7/2014 | Clawson | H04W 4/90 |
| | | | 455/404.1 |
| 2014/0282934 A1* | 9/2014 | Miasnik | G06F 17/30861 |
| | | | 726/5 |
| 2014/0287714 A1* | 9/2014 | Marshall | H04W 4/12 |
| | | | 455/404.2 |
| 2014/0320590 A1* | 10/2014 | Laurentino | H04N 7/155 |
| | | | 348/14.08 |
| 2014/0368601 A1* | 12/2014 | deCharms | H04W 4/021 |
| | | | 348/14.02 |
| 2015/0031324 A1 | 1/2015 | Zentner et al. | |
| 2015/0156321 A1* | 6/2015 | Abnett | G06F 16/2455 |
| | | | 379/45 |
| 2015/0304300 A1* | 10/2015 | Bender | H04L 12/1895 |
| | | | 726/4 |
| 2016/0088455 A1* | 3/2016 | Bozik et al. | H04W 4/90 |
| | | | 370/225 |
| 2017/0099579 A1* | 4/2017 | Ryan | H04W 4/029 |
| 2017/0154477 A1* | 6/2017 | Chung | G07C 5/008 |

* cited by examiner

METHODS FOR PROCESSING SOLICITED MULTIMEDIA FILES

BACKGROUND OF THE INVENTION

Individuals increasingly use portable electronic devices (e.g., cellular phones, tablet computers, and the like) to record multimedia files (e.g., image files, video files, audio files, and combinations thereof) that capture information that may be of interest to various organizations, including but not limited to law enforcement, emergency services, medical service providers, insurance companies, customer service centers, help desk centers, event organizations, and the like. Accordingly, individuals often contact an answering point provided by one of these organizations and ask to submit these multimedia files. Organizations, after confirming the legitimacy of the request, may be disposed to accept the multimedia files because they may contain useful information. For example, within the context of a public safety answering point (e.g., a next generation 911 answering point), the multimedia file may contain evidence for an investigation, information that may aid deployment of emergency services, or other useful information.

Current procedures for authorizing, receiving, reviewing, and logging solicited multimedia received by an answering point include a patchwork of processes, which cannot efficiently handle the increasing number of multimedia file solicitations from individuals. For example, in existing systems, individuals may be instructed to submit multimedia files via email. These files are then manually processed. For example, the files may be scanned for malicious or inappropriate content, reviewed to determine their value, and associated with a related data record. Follow-up responses in the form of text messages, emails, and/or telephone calls may also be required if the individual does not include the information needed to identify the related data record. For example, the more time that passes between an initial contact with an answering point and the submission of a multimedia file, the more difficult it often becomes to associate the submitted file with a related data record. Accordingly, existing systems and methods rely on a number of manual steps that could not only become burdensome to answering point personnel but also prove ineffective as the number of solicitations increases.

Accordingly, there is a need for a method for processing solicited multimedia files.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some exemplary embodiments of the invention include a method for operating an answering point to process multimedia files associated with an incident. In one embodiment the method includes receiving a request to submit a multimedia file associated with the incident and, in response to receiving the request, transmitting a text message including an identifier of the incident to a communication device. The method also includes receiving, at the answering point, a reply to the text message, the reply including the multimedia file and the identifier, and storing, at the answering point, the multimedia file including using the identifier to link the multimedia file to an incident record for the incident.

Figure 1:
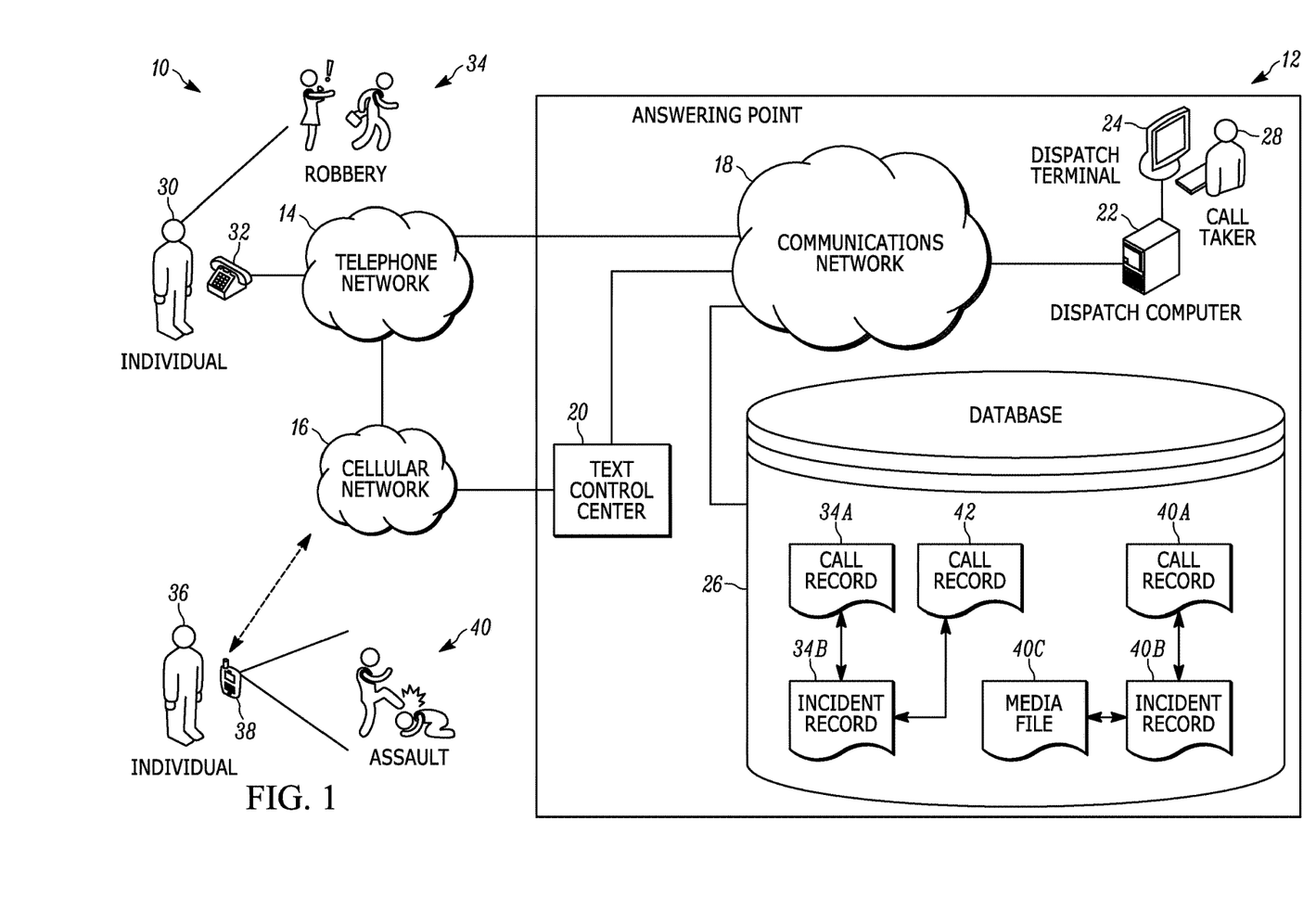
FIG. 1 is a block diagram of a system for processing solicited multimedia files in accordance with some embodiments.

FIG. 1 schematically illustrates a system 10 for processing solicited multimedia files from individuals who contact an answering point regarding an incident. Some embodiments of the system 10 may include systems associated with an insurance company that receives multimedia files relating to insurance claims, a medical service provider that receives multimedia files from relating to a medical condition, a help desk center that receives multimedia files relating to a technical support request, and the like. In particular, as used herein, the term "incident" can include any type of event or situation, for which an organization wants to control multimedia file submissions and provide a mechanism for linking multimedia file submissions with other information related to the event or situation.

As shown in FIG. 1, for illustrative purposes only, the system 10 could be a next generation 911 (NG911) system. However, as noted above, the system 10 may be any similar system for processing incident information. The system 10 includes an answering point 12, a telephone network 14, and a cellular network 16. Within a next generation 911 system, the answering point 12 may be referred to as a "public safety answering point." The answering point 12 includes a communications network 18, a text control center 20, a dispatch computer 22, a dispatch terminal 24, and a database 26. For ease of description, the system 10 illustrated in FIG. 1 includes a single answering point 12, telephone network 14, and cellular network 16. Other embodiments may include more than one answering point 12, telephone network 14, or cellular network 16. Similarly, some embodiments may include an answering point 12 with more than one communications network 18, text control center 20, dispatch computer 22, dispatch terminal 24, or database 26.

A call taker 28 may interact with the dispatch terminal 24 to answer communications received at the answering point 12 and access and modify data stored in the database 26. Within a next generation 911 system, the answering point 12 may perform computer aided dispatch (CAD) operations for law enforcement and other emergency services. Computer aided dispatch operations are known, and, therefore, for ease of description, they will not be described in detail. In alternative embodiments, the answering point 12 is configurable to perform computerized customer service and call center operations.

Communications received at the answering point 12 may include voice communications (i.e., voice calls) received over the telephone network 14 and the cellular network 16. The telephone network 14 includes the public switched telephone network (PSTN). Additionally or alternatively, in some embodiments, the telephone network 14 includes one or more voice over IP (VoIP) telephone networks. Also, in some embodiments, as an alternative to or in addition to the telephone network 14 and the cellular network 16, the answering point 12 receives other types of voice communications, including, for example, two-way radio communications and citizens band (CB) radio communications. Accordingly, in some embodiments, the answering point 12 communicates with communication networks in addition to the telephone network 14 and the cellular network 16.

Similarly, communications received at the answering point 12 may include data communications, including, for example, short message service (SMS) messages and multimedia message service (MMS) messages (collectively referred to herein as "text messages"), email messages, pages, instant messages, and the like. Accordingly, in some embodiments, the answering point 12 communicates with communication networks in addition to the telephone network 14 and the cellular network 16, such as the Internet or other public or private data networks.

The communications network 18 electrically interconnects the dispatch computer 22, the database 26, and other electronic components (not shown) included in the answering point 12. The communications network 18 also connects the answering point 12 to the telephone network 14. As illustrated in FIG. 1, in some embodiments, the answering point 12 communicates with the cellular network 16 through the telephone network 14. In other embodiments, the answering point 12 (e.g., through the communications network 18) communicates directly with the cellular network 16. As noted above, in some embodiments, the communications network 18 also connects the answering point 12 with other communication networks, such as a two-way radio communication network, a citizens band communication network, the Internet, or other private or public networks. Furthermore, in some embodiments, the communications network 18 connects the answering point 12 to another answering point.

The communications network 18 passes voice and data traffic to, from, and within the answering point 12 using suitable network protocols and network equipment. The communications network 18 may also originate and terminate voice calls over the telephone network 14 and the cellular network 16. In some embodiments, the communications network 18 also transmits and receives text messages using the text control center 20 ("TCC") and the cellular network 16. In these situations, the text control center 20 acts as a gateway between the answering point 12 and the cellular network 16 by exchanging text messages (including performing any necessary conversions) between the answering point 12 and the cellular network 16. In some embodiments, functionality described herein as being performed by the text control center 20 can be performed by the dispatch computer 22 or vice versa. For example, in some embodiments, the text control center 20 can be incorporated into the dispatch computer 22 or another component of the answering point 12.

In some embodiments, the dispatch computer 22 includes, among other things, a processor (e.g., a microprocessor or another suitable programmable device), a memory (i.e., a computer-readable storage medium), and an input/output interface (not shown). The processor, the memory, and the input/output interface, as well as the other various modules are connected by one or more control or data buses. The use of control and data buses for the interconnection between and communication among the various modules and components would be known to a person skilled in the art in view of the invention described herein.

The memory may include a program storage area and a data storage area. The processor is connected to the memory and executes computer readable instructions ("software") stored in a random access memory (RAM) of the memory (e.g., during execution), a read only memory (ROM) of the memory (e.g., on a generally permanent basis), or another non-transitory computer readable medium. For example, software for processing solicited multimedia files, as described in below, may be stored in the memory. Also, within a next generation 911 system, software for computer aided dispatch operations may be stored in the memory. The software may include firmware, one or more applications, program data, filters, rules, one or more program modules, and/or other executable instructions. The processor is configured to retrieve software from the memory and execute the software.

The dispatch computer 22 is electrically connected to the dispatch terminal 24. The dispatch terminal 24 includes one or more input devices, output devices, or input and output devices including, for example, one or more displays, keyboards, keypads, mice, joysticks, touchscreens, speakers, microphones, and headsets. The dispatch computer 22 receives input from and provides output to the call taker 28 through the dispatch terminal 24. The dispatch computer 22 and the dispatch terminal 24 are capable of originating and terminating voice calls and text message communications, either alone, or by interfacing with network equipment (not shown) in the communications network 18.

The database 26 electronically stores information regarding incidents (e.g., incident records). For example, within a next generation 911 system, the database 26 may store information relating to aided dispatch operations (e.g., information relating to emergency events and public safety events). The dispatch computer 22 is configurable to read and write such information to and from the database 26. In the illustrated embodiment, the database 26 is a database housed on a suitable database server (not shown) and accessible by the dispatch computer 22 over the communications network 18. In alternative embodiments, the database 26 may be located on a computer external to the answering point 12 and accessible by the dispatch computer 22 over one or more networks.

The call taker 28 may be a dispatcher trained to handle incident communications. For example, within a next generation 911 system, the call taker 28 may be a public safety dispatcher trained to handle emergency communications. As noted above, these communications can include voice communications (e.g., voice calls) and data communications (e.g., text messages, email messages, pages, and the like). Based on the received communications, the call taker 28 uses the dispatch terminal 24 to manually dispatch the appropriate services to handle incidents reported by individuals. Alternatively or in addition, the dispatch computer 22 may be configured to automatically dispatch appropriate services. The dispatch computer 22 and the dispatch terminal 24 may also receive data input by the call taker 28, which is saved to the database. Generally, regardless of how or when an individual communicates with the answering point 12 about an incident, information about the communication is stored in the database 26.

For example, as illustrated in FIG. 1, an individual 30 may place a voice call to the answering point 12 using a communication device, such as a telephone 32 connected to the telephone network 14. For example, as an example with a next generation 911 system, an individual 30 may use the telephone 32 to report a robbery 34. The telephone 32 initiates the voice call, which is routed through the telephone network 14 to the answering point 12. The dispatch computer 22 generates and stores one or more records in the database 26 based on the voice call. For example, in some embodiments, the dispatch computer 22 generates a call record for each communication received by the answering point 12. The dispatch computer 22 may also modify a created call record in response to commands received from the call taker 28 through the dispatch terminal 24 (e.g., change information included in a call record or add information to a call record). In other embodiments, dispatch computer 22 also generates a call record in response to commands received from the call taker 28 through the dispatch terminal 24. Accordingly, each call record may include information generated by the dispatch computer 22 and any information received from the call taker 28 through the dispatch terminal 24.

For example, as illustrated in FIG. 1, a call record 34A is generated based on the voice call received from the telephone 32. The database 26 also stores an incident record 34B that is associated with the incident (e.g., the robbery 34) reported by the individual 30. The incident record 34B can be generated (e.g., automatically or in response to a manual initiation by the call taker 28) when a first communication is received for an incident. For example, within the context of a next generation 911 system, if the voice call originated from the telephone 32 contains the first communication received regarding the robbery 34, the incident record 34B is created when the voice call is received. As described below, if the answering point 12 receives a subsequent communication relating to a previously-reported incident, the answering point 12 generates a new call record for the communication and links the new call record with the existing incident record 34B (i.e., rather than generating a new incident record). In some embodiments, a call record may be linked to multiple incident records. For example, if a single voice call relates to multiple incidents, a call record associated with the voice call may be linked to multiple incident records. Also, in some embodiments, an incident record may be created prior to any communications received by the answering point 12 (e.g., an incident record can be created for each insurance claim submission, each event provided by an event organizer, each piece of technology serviced by a help desk organization, and the like).

Records stored in the database 26 include unique identifiers. For example, the call record 34A includes a unique call identifier, and the incident record 34B includes a unique incident identifier. The call record 34A is linked to the incident record 34B using the call identifier and the incident identifier. For example, the call record 34A can store the incident identifier of the incident record 34B and/or the incident record 34B can store the call identifier of the call record 34A. Alternatively or in addition, the dispatch computer 22 or the database 26 can store a mapping that links unique call identifiers to unique incident identifiers. The dispatch computer 22 uses the mapping to identify one or more unique incident identifiers linked to a particular call identifier.

As another example, an individual 36 may place a voice call to the answering point 12 using a communication device, such as a wireless device 38 connected to the cellular network 16. For example, within a next generation 911 system, the individual 36 may use the wireless device 38 to report an assault 40. The wireless device 38 initiates the voice call, which is routed to the answering point 12 (e.g., through the telephone network 14 and the cellular network 16). A call record 40A is created for the voice call and an incident record 40B is created (e.g., if an incident record is not already stored in the database 26). Both the call record 40A and the incident record 40B are stored in the database 26. Alternatively, the wireless device 38 may transmit a text message to the answering point 12 (i.e., rather than a voice call) regarding the assault 40, the text message is routed through the cellular network 16 to the text control center 20. The text control center 20 routes the text message to the communications network 18. A call record is generated and stored for the received text message as described above for the voice call. A call record for a received text message may include information regarding the text message including, for example, information regarding the individual 36 or the wireless device 38, time and date information, the text message itself, and the like.

An incident may be witnessed and reported by many individuals. Therefore, in some situations, many individuals may contact the answering point 12 regarding the same incident. Therefore, in some embodiments, a new call record is created for each communication received by the answering point 12 for an incident and each new call record is linked to a single incident record. In particular, the dispatch computer 22 may be configured to update an existing incident record with new information received from communications received subsequent to the creation of the incident record. For example, as illustrated in FIG. 1 within the context of a next generation 911 system, if another phone call or text message relating to the robbery 34 is received by the answering point 12, a new call record 42 is created, which is linked to the existing incident record 34B associated with the robbery 34. The existing incident record 34B may also be updated with information received from the subsequent communication relating to the robbery 34.

The wireless device 38 wirelessly communicates with the cellular network 16 and, in some embodiments, wirelessly communicates voice calls and text messages. As illustrated, the wireless device 38 is a smart phone. In alternative embodiments, the wireless device 38 may be, for example, a tablet, personal digital assistant (PDA), a smart watch, or other device that includes, or can be connected to, a network modem or components, which enable wireless network communications (such as a processor, memory, amplifier, antenna, or the like).

The wireless device 38 also records multimedia files including, for example, video files, audio files, and image files. Accordingly, in some situations, the wireless device 38 may record a multimedia file capturing data relating to an incident. The database 26 stores such multimedia files and links the multimedia files to incident records (e.g., similar to how a call record is linked to an incident record). For example, as illustrated in FIG. 1, a multimedia file 40C (e.g., a video file) capturing data regarding an incident (e.g., the assault 40) is linked to the corresponding incident record 40B. Similar to a call record, a multimedia file stored in the database 26 may be linked to multiple incident records. The database 26 may also store metadata associated with a multimedia file (e.g., within the multimedia file, a linked call record, the linked incident record, and/or another data record). The metadata may include a time and date a multimedia file was created, a geographic location of the device when a multimedia file was created, and the like.

Individuals may offer to provide (e.g., during an initial communication with the answering point 12 or as an offer made after or unrelated to an initial communication) recorded multimedia files containing data relating to incidents. To handle these multimedia files, the dispatch computer 22 is configured to request, receive, and link multimedia files with incident records stored in the database 26.

The process for requesting, receiving, and automatically associating received multimedia files with incident records stored in the database 26 may take place in two stages. A first stage may include authorizing a multimedia file request, and a second stage may include associating a submitted multimedia file to an incident record.

Figure 2:
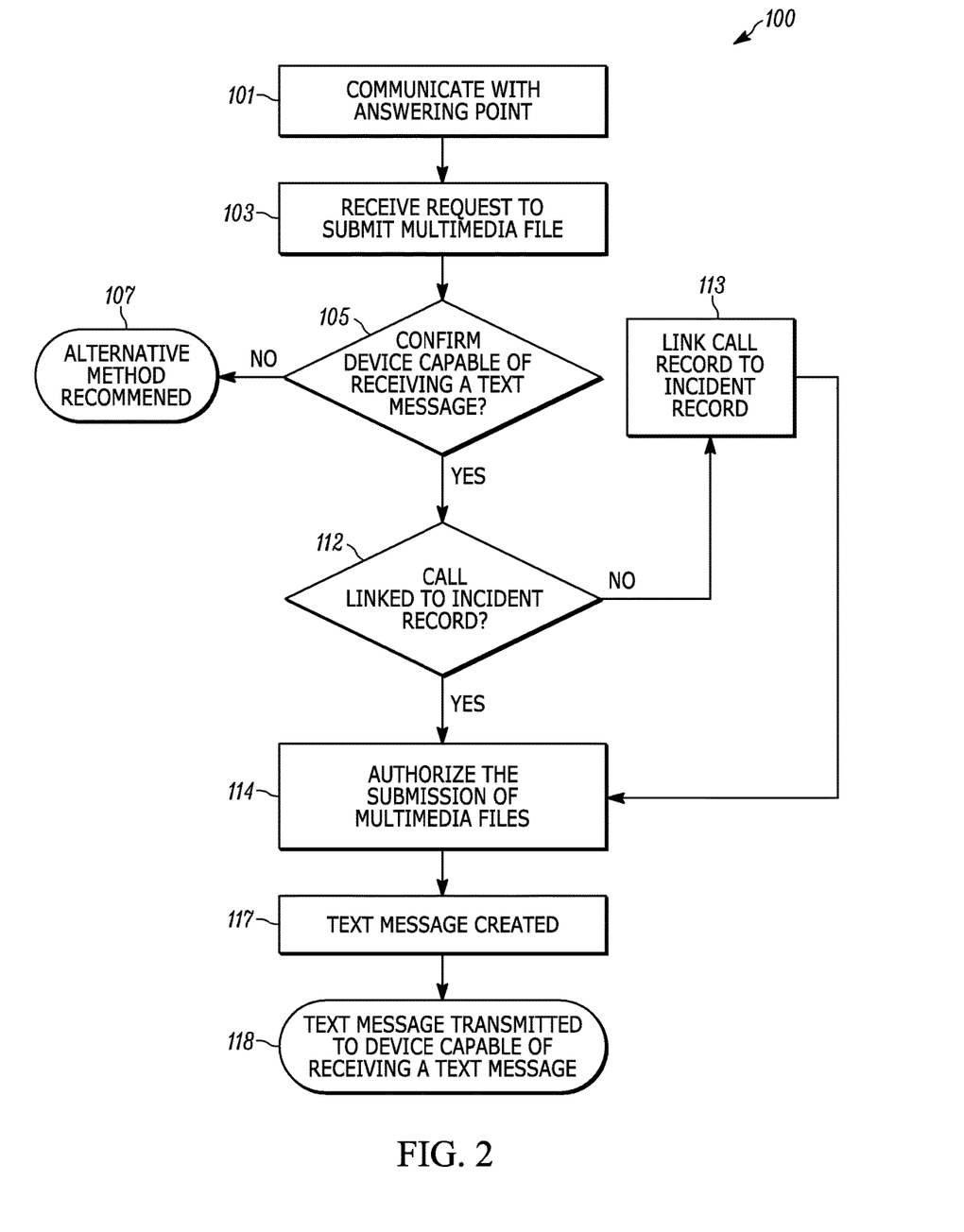
FIG. 2 is a flowchart of a method of operating an answering point to authorize a multimedia file submission in accordance with some embodiments.

FIG. 2 illustrates a method 100 for authorizing a multimedia file request received by an answering point 12. As an example, the method 100 is described herein in terms of the answering point 12 receiving a request from an individual 36 to submit the multimedia file 40C associated with the assault 40. At block 101, the answering point 12 receives a communication (e.g., through a voice call or a text message). As described above, the call record 40A is created for the communication, and the call record 40A is linked to the incident record 40B. At block 103, a request to submit the multimedia file 40C is received by the answering point 12. If the communication includes a text message, the text message can include the request to submit the multimedia file 40C.

At block 105, a confirmation is performed that a communication device capable of receiving a text message is available. If the communication is a text message, this confirmation may not be necessary (e.g., the receipt of the text message indicates that the communication device capable of receiving a text message). Alternatively, if the communication is a voice call, the dispatch computer 22 (e.g., through the dispatch terminal 24) may prompt the call taker 28 to ask the individual 36 whether he or she has a communication device capable of receiving a text message. If a communication device capable of receiving a text message is not available, an alternative method for receiving the multimedia file 40C is recommended at block 107. Alternative methods for submitting the multimedia file 40C may include sending the multimedia file 40C in an email with a reference number or passphrase, submitting the multimedia file 40C using a website, or delivering the multimedia file 40C to law enforcement on a flash drive or other suitable computer-readable medium.

Some communication devices are capable of transmitting and receiving text messages without being connected to a cellular network. For example, some tablet computers, smart phones, and other computing devices are configured to transmit and receive text messages through the use of a gateway configured to receive a text message on a cellular network and transmit the text message on a different network (e.g., a Wi-Fi network or other data communication network). The gateway is transparent to devices receiving text messages from or transmitting text messages to such devices. Therefore, these types of devices may be considered capable of receiving text messages for purposes of the systems and methods described herein.

If a communication device capable of receiving a text message is available (at block 105), a telephone number is obtained for the communication device. In some embodiments, the dispatch computer 22 identifies the telephone number for the communication device that is communicating with the answering point 12. The dispatch computer 22 may make this identified telephone number available to the call taker 28 through the dispatch terminal 24 and may prompt the call taker 28 to ask the individual 36 to verify the telephone number as being associated with a communication device capable of receiving a text message. If the individual 36 verifies the telephone number, the dispatch computer 22 authorizes a text message to automatically-identified telephone number as described below.

Alternatively, a text message to a different telephone number than the telephone number associated with the communication device communicating with the answering point 12 may be authorized. For example, if the telephone 32 is communicating with the answering point 12, an alternative telephone number may be received. An alternative telephone number may also be received when the communication device communicating with the answering point 12 is capable of receiving text messages but does not contain the multimedia file 40C.

Figure 3A:
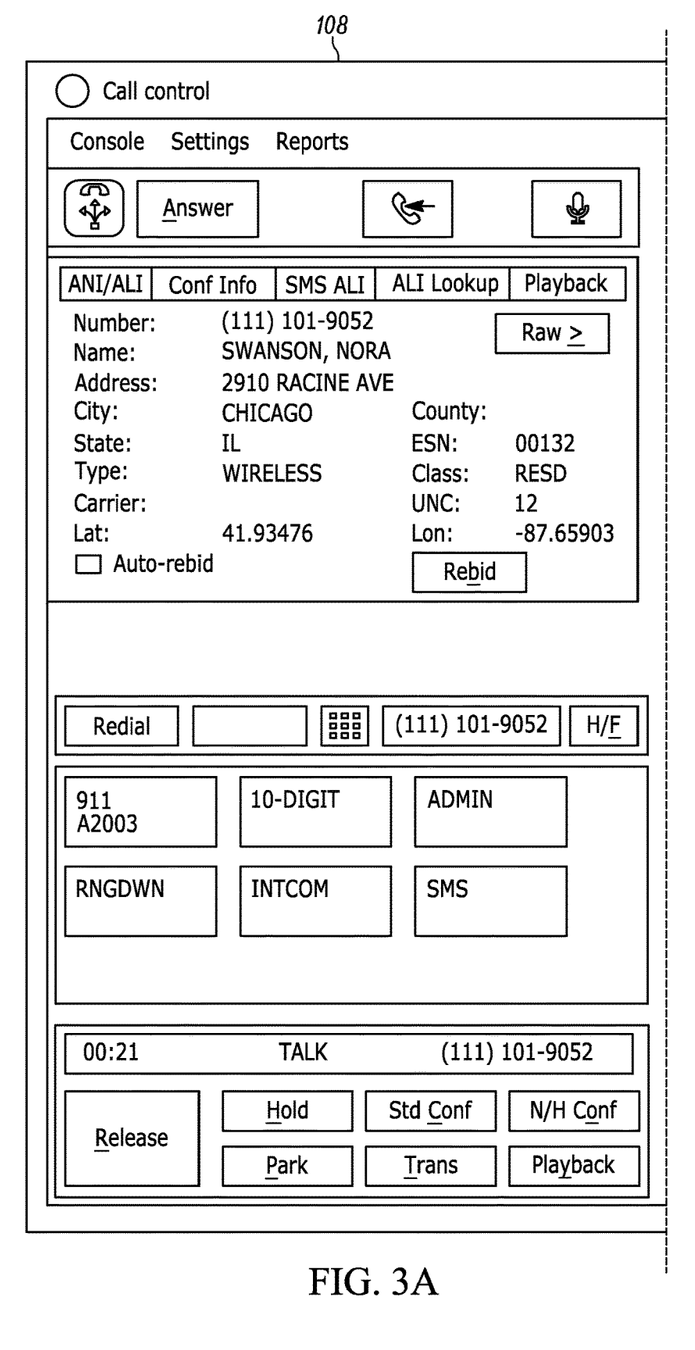
FIG. 3A and FIG. 3B illustrate a graphical user interface for providing authorization of a multimedia file submission in accordance with some embodiments.
Figure 3B:
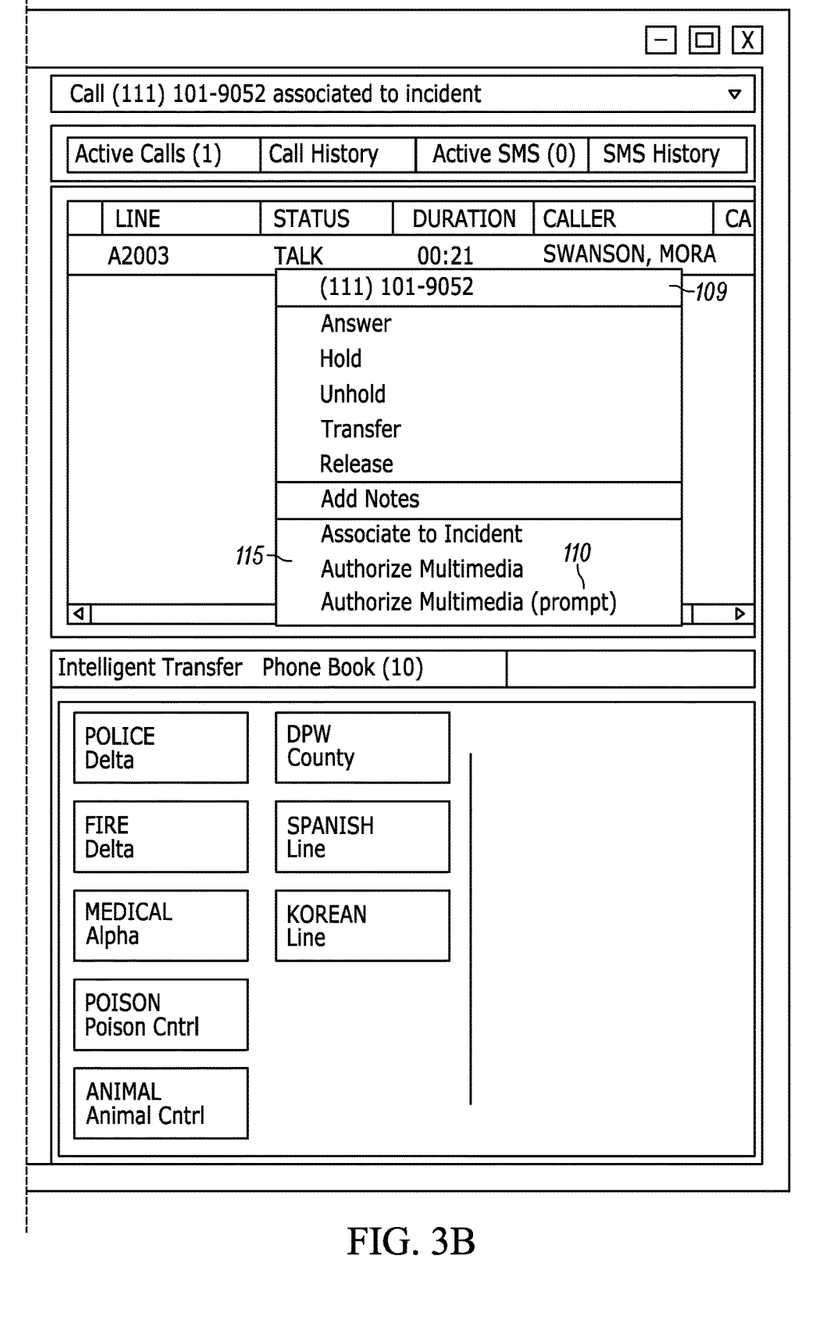

For example, FIG. 3A and FIG. 3B illustrate a portion of a graphical user interface 108 generated on the dispatch computer 22 and displayed on the dispatch terminal 24. As illustrated in FIG. 3A and FIG. 3B, the graphical user interface 108 includes a menu 109 including one or more menu selections selectable by the call taker 28. In particular, the menu 109 includes an "Authorize Multimedia Prompt" menu selection 110. If the call taker 28 selects the "Authorize Multimedia Prompt" menu selection 110, a dialog box 111 (see FIG. 4) is displayed within the graphical user interface 108. The dialog box 111 prompts the call taker 28 to enter a telephone number. In some embodiments, if an alternative telephone number for receiving a text message is provided, the dispatch computer 22 generates a new call record associated with the alternative telephone number and links the new call record to the incident record 40B. Alternatively or in addition, in some embodiments, the dispatch computer 22 adds the alternative telephone number to the call record 40A.

The dispatch computer 22 is also configured to verify that all call records generated based on the communication (i.e., the call record 40A generated for the initial communication and any additional call records generated) are linked to an incident record at block 112 (see FIG. 2). If any call record has not yet been associated with an incident record, dispatch computer 22 may associate the call record with an incident record at block 113. In some embodiments, the dispatch computer 22 associates a call record with an incident record in response to commands received from the call taker 28 through the dispatch terminal 24.

Figure 4:
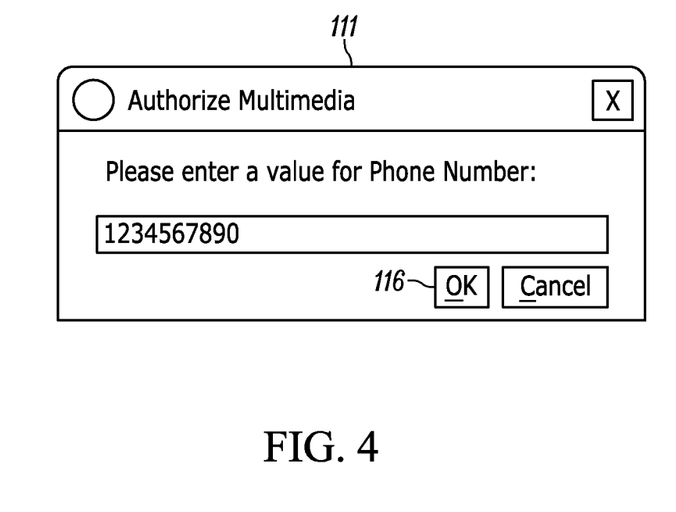
FIG. 4 is an illustration of a dialog box for providing authorization of a multimedia file submission in accordance with some embodiments.

The dispatch computer 22 also receives the authorization for the submission of multimedia files at block 114. This authorization may be received through a selection mechanism displayed within a graphical user interface provided on the dispatch terminal 24. For example, as illustrated in FIG. 3A and FIG. 3B, the call taker 28 may select an "Authorize Multimedia" menu selection 115 within the graphical user interface 108 to authorize submission of multimedia files. In some embodiments, if an alternative telephone number is received as described above (see FIG. 4), receiving this telephone number may serve as the authorization for the submission of multimedia files. For example, if a telephone number is received in the dialog box 111 as illustrated in FIG. 4, selecting the "OK" button 116 authorizes the submission of multimedia files from the device associated with the entered telephone number. Accordingly, in these situations, it may not be necessary to select the "Authorize Multimedia" menu selection 115 to authorize the submission. It should be understood that in some embodiments the individual communicating with the answering point 12 through a communication device may provide input described above as being provided by the call taker 28.

Returning to FIG. 2, at block 117, after authorizing the submission of multimedia files, the dispatch computer 22 creates a text message. The text message may include plain text instructions for submitting the multimedia file 40C. The text message also includes an identifier of the incident. In some embodiments, the identifier is embedded in metadata included with the text message (e.g., a message header) and is not included in the plain text of the text message. In some embodiments, the identifier includes a call identifier for a call record (e.g., the call record 40A or a new call record generated based on a received alternative telephone number). Alternatively or in addition, the identifier includes an incident identifier for an incident record (e.g., the incident record 40B). Alternatively or in addition, the identifier may include a unique identifier assigned by the dispatch computer 22 (i.e., distinct from a call identifier and an incident identifier). For example, the dispatch computer 22 may assign text messages a unique identifier (e.g., sequential numbers or random numbers) and create and store a mapping that maps the assigned unique identifier to one or more call identifiers and/or to one or more incident identifiers. Using this extra layer of mapping provides security by preventing the external communication of identifier associated with records stored in the database 26. For example, even if the identifier can be extract from the text message, the identifier provides no information regarding the identifiers of call records or incident records stored in the database 26 that otherwise could be used to compromise the database 26.

The dispatch computer 22 may assign an expiration term to the text message. The expiration term may be included in the text message (e.g., in the plain text instructions and/or in the metadata) and/or may be stored in the database 26 (e.g., in a call record and/or an incident record). The expiration term specifies a date range or deadline for providing a reply to the text message (e.g., three days from transmitting the text message). If a reply to the text message is received after the expiration term, the dispatch computer 22 may automatically discard the reply and any multimedia files included in the reply. The expiration term assigned to the text message may be manually specified (e.g., through the graphical user interface 108) or set to a default term by the dispatch computer 22.

At block 118, after creating the text message, the dispatch computer 22 transmits the created text message to the communication device capable of receiving text message, such as the wireless device 38. Transmitting the text message to the wireless device 38 may include transmitting the text message to the text control center 20, which translates the created text message into a text message capable of delivery over the cellular network 16 or other data communication network and transmits the translated text message to the wireless device 38 over the appropriate network.

Before or after transmitting the text message, the dispatch computer 22 may display a status message on the dispatch terminal 24 informing the call taker 28 that the text message has been transmitted. The status message may include the telephone number that the text message was transmitted. The dispatch computer 22 may also add information to a transaction log, a call record, an incident record, or a combination thereof regarding the text message. In some embodiments, the text control center 20 performs all or a subset of the functionality described above for creating and transmitting the text message.

In an alternative embodiment, rather than directly contacting the answering point 12 (e.g., through a voice call, a text message, an email message, a two-way radio communication, a citizens band radio communication, and the like), an individual may verbally communicate with a representation of an organization (e.g., a police officer or other public safety personnel at the scene of a crime or other incident or at another location, such as a police station or customer service or sales representative at a retail location) to make an in-person request to submit multimedia files associated with one or more incidents. In these situations, the individual may provide the representative with a telephone number for a device capable of receiving a text message. The representative may provide this information to the answering point 12 (e.g., via a communication with the answering point 12 as described above or through verbal communications with a call taker 28). The telephone number is received by the dispatch computer 22 as described above (e.g., using the dialog box 111). A call record is then created and is linked to an incident record (e.g., an existing incident record or a new incident record created by the call taker 28 if necessary) as described above. Similarly, the submission of the multimedia files may be authorized as described above. Alternatively, the graphical user interface 108 may be configured to allow the representative to remotely access the answering point 12 to enter the provided telephone number and authorize the submission of multimedia files as described above.

Figure 5:
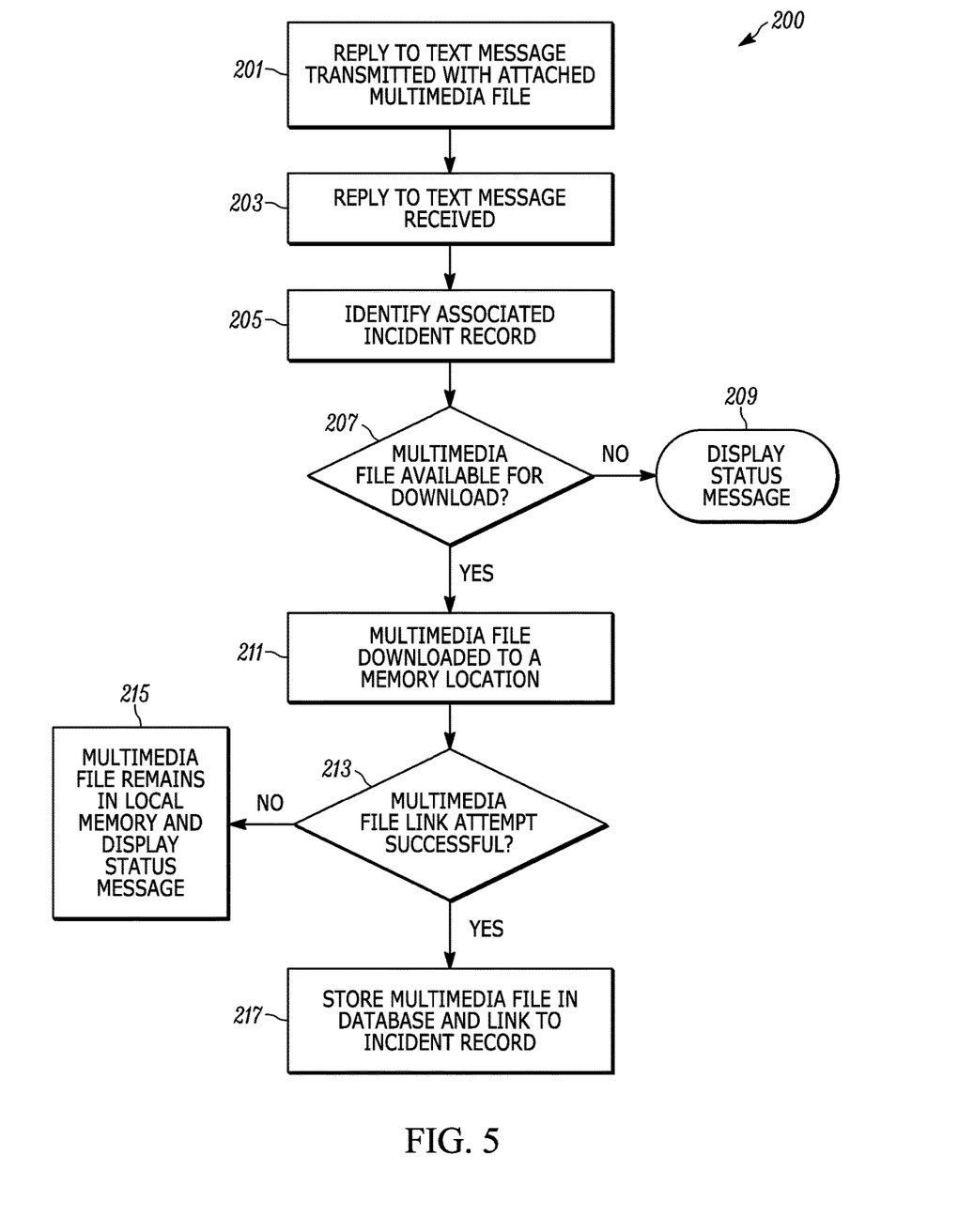
FIG. 5 is a flowchart of a method of operating an answering point to link a multimedia file to an incident record in accordance with some embodiments.

FIG. 5 illustrates a method 200 for associating a submitted multimedia file to an incident record. Again, as an example, method 200 is described herein within the context of associating the multimedia file 40C submitted using the wireless device 38 to the incident record 40B. The wireless device 38 receives the text message created by the dispatch computer 22. The wireless device 38 is configured to create a reply text message including the multimedia file 40C (e.g., as an attachment). At block 201, the wireless device 38 transmits the reply text message to the answering point 12. In some embodiments, the text control center 20 receives the reply text message and routes the reply text message to the dispatch computer 22. In some embodiments, the dispatch computer 22 displays a message on the dispatch terminal 24 informing the call taker 28 that the multimedia file 40C was received.

At block 205, the dispatch computer 22 identifies an incident record that the submitted multimedia file 40C should be linked to. For example, the reply to the text message can include similar metadata as the original text message transmitted by the answering point 12, including the identifier of the incident. Accordingly, the dispatch computer 22 can use the identifier included in the reply to the text message to identify an incident record associated with the submitted multimedia file 40C. For example, as noted above, the identifier of the incident may include a call identifier for a call record. Accordingly, the dispatch computer 22 may use the call identifier included in the reply text message to identify the call record 40A stored in the database 26. The dispatch computer 22 uses the identified call record 40A to identify the associated incident record 40B (e.g., using an incident identifier included in the call record 40A or a mapping that links the call record 40A to the incident record 40B).

Alternatively, as noted above, the identifier of the incident may include an incident identifier for an incident record. In these situations, the dispatch computer 22 may link the multimedia file 40C to the incident record 40B without identifying the call record 40A. Similarly, as also noted above, the identifier of the incident may include an identifier assigned by the dispatch computer 22 that is mapped to a call identifier and/or an incident identifier through a mapping stored by the dispatch computer 22. In these situations, the dispatch computer 22 uses the identifier in the reply text message and the mapping to identify the incident record to link the multimedia file 40C to.

In some embodiments, a submitted multimedia file is linked to multiple incident records. For example, a reply text message may include multiple identifiers associated with multiple incidents. Alternatively or in addition, the identifier of the incident included in the reply text message may be associated with a call record that is linked to multiple incident records. In these situations, the dispatch computer 22 may be configured to link the submitted multimedia file with each incident record that the associated call record is linked to.

After identifying the incident record, the dispatch computer 22 determines if the multimedia file 40C is available for download (e.g., from the text control center 20) to a local memory location (e.g., a folder structure) of the dispatch computer 22 (at block 207). If the multimedia file 40C cannot be downloaded, the dispatch computer 22 displays a status message on the dispatch terminal at block 209. In this situation, the dispatch computer 22 may re-authorize the individual 36 to submit multimedia files (e.g., by transmitting a new authorization text message).

If the multimedia file 40C is available for download, the multimedia file 40C is downloaded at block 211. In some embodiments, the multimedia file 40C is downloaded to a memory location associated with the incident that the multimedia file 40C is associated with. For example, the dispatch computer 22 may determine a file path for the multimedia file 40C based on the identifier of the incident included in the reply text message. In particular, as described above, the dispatch computer 22 uses the identifier included in the reply text message to determine an incident record to link the multimedia file to. The dispatch computer 22 may then use the unique incident identifier for the determined incident record to determine a file path for the multimedia file 40C. In particular, all multimedia files submitted for a particular incident record may be downloaded to a directory, folder, or other data storage mechanism that has a name that includes a unique incident identifier or a portion thereof. For example, if an incident record has a unique identifier of "012345," multimedia files linked to the incident record may be downloaded to a memory location designated by the file path "c:\system\downloads\012345," where "012345" identifies a directory or folder. To preserve the uniqueness of files downloaded to this directory or folder, the dispatch computer 22 may determine if the name of a multimedia file to be downloaded exists in the director or folder and may modify the name of the multimedia file if necessary (e.g., append a suffix to the name). The memory location receiving downloaded multimedia files may be included in the database 26, a memory module within the dispatch computer 22, or another memory module within the answering point 12.

At block 213, after downloading the multimedia file 40C, the dispatch computer 22 attempts to link the multimedia file 40C to the incident record 40B (i.e., store the multimedia file 40C in the database 26 and link the multimedia file 40C to the incident record 40B as the call record 40A is linked to the incident record 40B). At block 215, if the multimedia file 40C cannot be linked to the incident record 40B (e.g., the database 26 is unavailable or the incident record 40B cannot be accessed), the multimedia file 40C is left in the memory location where the multimedia file 40C was originally downloaded. The dispatch computer 22 may also display a status message on the dispatch terminal 24 informing the call taker 28 that the multimedia file 40C has not been linked to the incident record 40B. As noted above, the memory location originally storing downloaded multimedia files may include directories or folders that uniquely identify a particular incident. Accordingly, the directory or folder name can be used to subsequently link a downloaded multimedia file to an incident record without having to go through the process of identifying the associated incident record as described above.

At block 217, if the multimedia file 40C can be linked to the incident record 40B, the multimedia file 40C is stored in the database 26 and is linked with the incident record 40B. In some embodiments, the dispatch computer 22 stores the multimedia file 40C and metadata associated with the multimedia file 40C in the database 26. In some embodiments, the metadata includes the identifier included in the reply to the text message, the associated call identifier and/or incident identifier, or both, which allows the multimedia file 40C to be linked to the incident record 40B.

In some embodiments, if the incident record 40B is not yet stored in the database 26, an object (e.g., a computer aided dispatch form) is updated with the multimedia file 40C. The object can include instructions on how to attach the multimedia file 40C when the incident record 40B is subsequently submitted to the database 26. The object can be locally stored in the dispatch computer 22, stored in the database 26, or a combination thereof.

After linking the multimedia file 40C to the incident record 40B in the database 26 (or after creating the object storing the multimedia file 40C), the dispatch computer 22 displays a status message on the dispatch terminal 24, logs the transaction (e.g., in the incident record 40B), and deletes the multimedia file 40C from the memory where the multimedia file 40C was originally downloaded.

As noted above, functionality performed by the dispatch computer 22 described above may be performed by the text control center 20 or vice versa. For example, in some embodiments, the text control center 20 may store a local mapping of call identifiers and/or incident identifiers and associated text message identifiers. Accordingly, when a reply text message is received, the text control center 20 may be configured to identify the incident record and/or the call record associated with the reply text message using the locally-stored mapping and provide this information to the dispatch computer 22. Also, in some embodiments, the text control center 20 may be configured to download multimedia files attached to reply text messages and provide a link to the dispatch computer 22 that the dispatch computer 22 can use to download the multimedia files.

Transmitting the text message from the answering point 12 to the communication device authorizes the submission of a multimedia file. Accordingly, the text message allows the answering point 12 to receive multimedia files determined to be informative and relating only to an incident tracked by the answering point 12. In particular, allowing unauthorized multimedia file submissions may overload the answering point 12 and may cause the answering point 12 to receive and ultimately process multimedia files that are not associated with incidents tracked by the answering point 12 or that contain malicious or inappropriate content. Also, the identifier included in the text message allows the dispatch computer 22 to link a submitted multimedia file to an existing incident record. This functionality keeps submitted multimedia files linked to incidents tracked by the answering point 12 and reduces the need to manual process multimedia files, which, in some situations, may not be able to properly link a multimedia file to a particular incident.

The references to a public safety answering point within a next generation 911 system were provided as one example of an answering point. However, as noted above, the systems and methods described above are not limited to public safety answering points and may be used by various organizations who receive multimedia files from individuals. For example, in alternative embodiments, the answering point 12 may be associated with an insurance company that receives multimedia files from a communication device associated with claimant or an adjuster relating to an insurance claim. In particular, the answering point 12 may receive a communication (e.g., a voice call) from a communication device relating to a claim against an insurance policy provided by the insurance company, such as for repairs to a vehicle following a car accident or for repairs to a residence after a storm. The received communication may include a request to submit a multimedia file relating to the claim, such as an image of damage to the vehicle or residence. The answering point 12 accesses or creates an incident record associated with the claim and creates a call record for the communication as described above. Similarly, the answering point 12 authorizes the submission of multimedia files as described above, which causes a text message to be transmitted to communication device capable of receiving a text message. The communication device generates a reply to the text message that includes the multimedia file (e.g., as an attachment). The reply to the text message is transmitted by the communication device to the answering point 12, and the answering point 12 processes the received text message and submitted multimedia file as described above.

As another embodiment, the answering point 12 may be associated with a medical service provider that receives multimedia files from patients relating to a specific injury, condition, or other medical incident. Similarly, the answering point 12 may be associated with a customer service center that receives multimedia files from customers relating to services or products. Furthermore, the answering point 12 may be associated with a help desk center that receives multimedia files from individuals experiencing technical difficulties relating to a particular technology. In addition, the answering point 12 may be associated with an event organization that receives multimedia files from individuals participating in an event provided by the organization, such as a conference, a concert, a play, a charity event, a political event, a corporate event, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for operating a public safety answering point to process multimedia files associated with an incident, the method comprising:
   receiving, at the public safety answering point, a first text message from a communication device, the first text message including a request to submit a multimedia file associated with the incident;
   in response to receiving the first text message including the request, transmitting a second text message including an identifier linked to an incident record associated with the incident to the communication device;
   receiving, at the public safety answering point, a reply to the second text message, the reply including the multimedia file and the identifier; and
   storing, at the public safety answering point, the multimedia file including using the identifier to link the multimedia file to the incident record.

2. The method of claim 1, further comprising:
   creating, at the public safety answering point, a call record including a unique call identifier based on the request, and
   linking, at the public safety answering point, the call record to the incident record, wherein the identifier included in the second text message includes the unique call identifier.

3. The method of claim 2, wherein storing, at the public safety answering point, the multimedia file includes accessing the call record using the unique call identifier, identifying the incident record for the incident based on the call record, and linking the multimedia file to the incident record.

4. The method of claim 2, wherein linking the call record to the incident record includes linking the call record to a plurality of incident records, wherein the plurality of incident records includes the incident record for the incident.

5. The method of claim 4, wherein storing, at the public safety answering point, the multimedia file includes accessing the call record using the unique call identifier, identifying the plurality of incident records based on the call record, and linking the multimedia file to each of the plurality of incident records.

6. The method of claim 1, further comprising displaying, at the public safety answering point, a graphical user interface and receiving, at the public safety answering point, a telephone number associated with the communication device through the graphical user interface.

7. The method of claim 6, further comprising:
   creating, at the public safety answering point, a first call record including a first unique call identifier based on the request,
   creating, at the public safety answering point, a second call record including a second unique call identifier based on the communication device associated with the telephone number, and
   linking, at the public safety answering point, the second call record to the incident record, wherein the identifier included in the second text message includes the second unique call identifier.

8. The method of claim 1, further comprising:
   assigning, at the public safety answering point, a unique identifier to the request, and
   storing, at the public safety answering point, a mapping that maps the unique identifier to a unique incident identifier of the incident record, wherein the identifier included in the second text message includes the unique identifier.

9. The method of claim 8, wherein storing, at the public safety answering point, the multimedia file includes accessing the mapping, identifying the incident record for the incident using the mapping and the unique identifier, and linking the multimedia file to the incident record.

10. The method of claim 1, further comprising assigning, at the public safety answering point, an expiration term to the second text message and discarding, at the public safety answering point, the reply to the second text message when the reply to the second text message is received after the expiration term.

11. The method of claim 1, wherein using the identifier to link the multimedia file to the incident record for the incident includes accessing the identifier in metadata included in the second text message.

12. The method of claim 1, where transmitting the second text message includes transmitting the second text message to a text control center.

13. A system for processing multimedia files associated with an incident, the system comprising:
   a database storing an incident record of an incident; and
   a dispatch computer configured to
      receive, at a public safety answering point, a first text message from a communication device, the first text message including a request to submit a multimedia file associated with the incident,
      in response to receiving the first text message including the request, transmit a second text message including an identifier linked to the incident record to the communication device,
      receive a reply to the second text message, the reply including the multimedia file and the identifier, and
      store the multimedia file to the database including using the identifier to link the multimedia file to the incident record.

14. The system of claim 13, wherein the identifier included in the second text message includes a unique identifier of the incident record.

15. The system of claim 13, wherein the dispatch computer is further configured to create a call record including a unique call identifier based on the request and link the call record to the incident record, wherein the identifier included in the second text message includes the unique call identifier.

16. The system of claim 13, wherein the identifier is included in metadata of the second text message.

17. The system of claim 13, wherein the dispatch computer is further configured to display a graphical user interface on a dispatch terminal and receive a telephone number associated with the communication device through the graphical user interface.

18. The system of claim 17, wherein the dispatch computer is further configured to create a first call record including a first unique call identifier based on the request, store the first call record to the database, link the first call record to the incident record, create a second call record including a second unique call identifier based on the telephone number, store the second call record in the database, and link the second call record to the incident record, wherein the identifier included in the second text message includes the second unique call identifier.

19. The system of claim 13, wherein the dispatch computer is further configured to assign an expiration term to the second text message and discard the reply to the second text message when the reply to the second text message is received after the expiration term.

* * * * *